(No Model.) 2 Sheets—Sheet 1.

J. W. LARISH & W. MAVER, Jr.
DUPLEX TELEGRAPH.

No. 361,364. Patented Apr. 19, 1887.

Witnesses
Geo. W. Breck
A. Hamilton Morris

Inventors
Joseph W. Larish
William Maver Jr.,
By their Attorneys
Pope & Edgecomb (No Model.) 2 Sheets—Sheet 2.

J. W. LARISH & W. MAVER, Jr.
DUPLEX TELEGRAPH.

No. 361,364. Patented Apr. 19, 1887.

Witnesses
Geo. W. Breck.
A. Hamilton Morris.

Inventors
Joseph W. Larish
William Maver Jr.,
By their Attorneys
Pope & Edgcomb

UNITED STATES PATENT OFFICE.

JOSEPH W. LARISH, OF BUFFALO, NEW YORK, AND WILLIAM MAVER, JR., OF JERSEY CITY, NEW JERSEY, ASSIGNORS TO THE BALTIMORE AND OHIO TELEGRAPH COMPANY, OF BALTIMORE, MARYLAND.

DUPLEX TELEGRAPH.

SPECIFICATION forming part of Letters Patent No. 361,364, dated April 19, 1887.

Application filed July 3, 1886. Serial No. 207,050. (No model.)

*To all whom it may concern:*

Be it known that we, JOSEPH W. LARISH and WILLIAM MAVER, Jr., citizens of the United States, residing, respectively, in Buffalo, in the county of Erie and State of New York, and in Jersey City, in the county of Hudson and State of New Jersey, have jointly invented certain new and useful Improvements in Duplex Telegraphs, of which the following is a specification.

Our invention relates to an organization of apparatus employed for simultaneously transmitting messages in opposite directions over the same main line.

The object of the invention is to provide means for neutralizing the effect upon the differential receiving-instruments usually employed in such systems of the static charge and discharge, which takes place upon connecting and disconnecting the transmitting-batteries with the line.

In general terms, the invention consists in connecting a condenser with the artificial line at the moment of closing the circuit with the battery and transmitting a current to line and in disconnecting such condenser upon the interruption of the current, and also in establishing a temporary connection from the battery to the artificial line at the moment the discharge of the main line takes place. The condenser serves to compensate for the static charge by receiving a current equivalent to that passing to the line, and the momentary connection of the battery with the artificial line serves to transmit a momentary impulse back through one coil of the differential receiving-instrument equivalent to the discharge-current of the main line. The condenser, when it is disconnected from the artificial line, is connected with the earth, and thus allowed to discharge.

Figure 1:
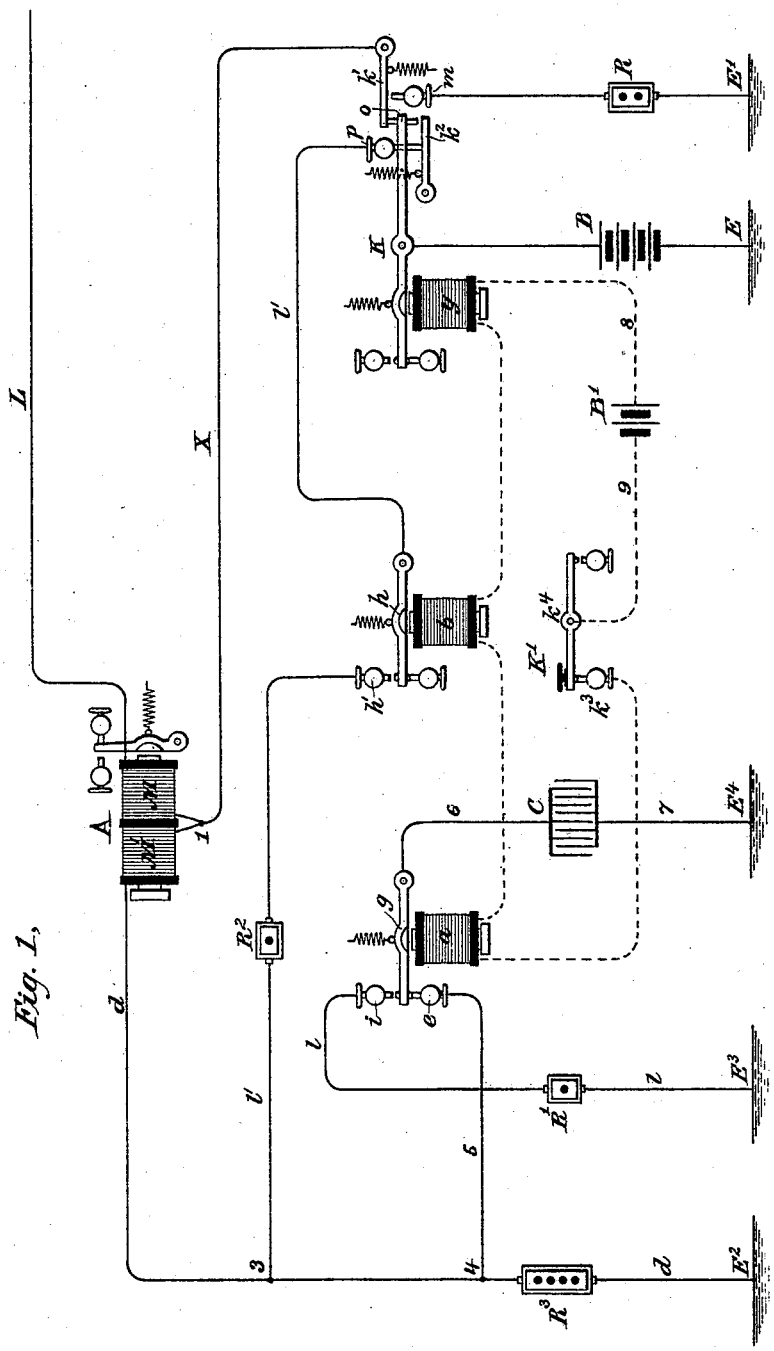
Figure 2:
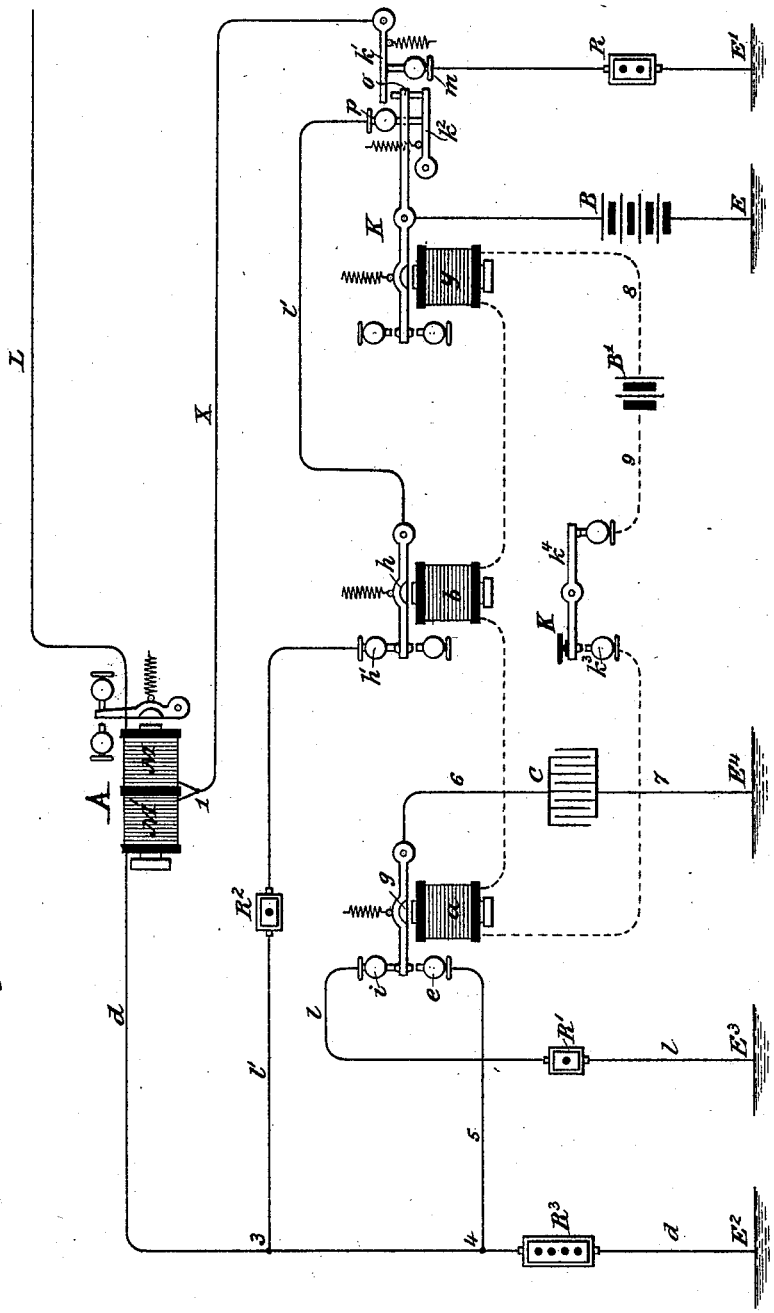

In the accompanying drawings, Figure 1 illustrates an organization of the apparatus, showing the parts in the position they occupy when a current is being sent to line through the differential receiving-instrument. Fig. 2 illustrates the apparatus in the position which it occupies upon the moment of disconnecting the main battery from the line.

Referring to the figures, L represents a main line and $d$ an artificial line. They are respectively connected through the coils M and M' of a differential receiving-instrument and unite at the point 1. A conductor, X, leads from the point 1 to a lever, $k'$, applied to a continuity-preserving key, K. The lever of the key K is connected with one pole of a battery, B, the other pole of which is connected with the earth at E. A second lever, $k^2$, is applied to the key K on the opposite side, and these two levers $k'$ and $k^2$ are respectively provided with stops $m$ and $p$, against which they tend to rest. The key K carries a circuit-closing point, $o$, which vibrates between two levers, $k'$ and $k^2$, in a manner well understood. The stop $m$ is connected through an artificial resistance, R, with the earth at E'. The stop $p$ is connected through the line $l'$ with a lever, $h$, applied to an electro-magnet, $b$. A back stop, $h'$, applied to this lever, is connected through an artificial resistance, $R^2$, with the artificial line $d$ at a point, 3. An artificial resistance, $R^3$, is included in the line $d$, between the point 3 and the earth at $E^2$. A conductor, 5, leads from a point, 4, in the line $d$ to a front stop, $e$, applied to the lever $g$ of an electro-magnet, $a$. Back stop, $i$, of this lever is connected by a conductor, $l$, through an artificial resistance, R', with the earth at $E^3$. The lever $g$ is connected by a conductor, 6, with one plate of a condenser, C, the remaining plate of which is connected by a conductor, 7, with the earth at $E^4$. When, therefore, the electro-magnet $a$ is vitalized, the condenser is connected through the conductor 6 and lever $g$ with the point $e$, and thus with the artificial line. At other times it is connected through the stop $i$ and resistance R' with the earth at $E^3$. The electro-magnets $a$ and $b$ are both included in the circuit of a battery, B', which also includes the electro-magnet $y$, employed for operating the key K. For this purpose a conductor, 8, leads from one pole of the battery B' through the several electro-magnets to a stop, $k^3$, of a key, K'. The lever $k^4$ of this key is connected by a conductor, 9, with the other pole of the battery B'. By the operation of the key K' therefore the circuit of the battery B' is made and interrupted.

The operation of the apparatus is as follows:

When the key K' is in the position shown in Fig. 1, closing the circuit of the battery B', a current is sent through all the electro-magnets $a$, $b$, and $y$. The stop $o$ is then against the lever $k'$, holding it away from the stop $m$, while the lever $k^2$ rests against the stop $p$. The battery B is thus connected through the conductor X with the point 1, and thus with both the coils M and M' of the differential electro-magnet A. At the same time the lever $g$ of the electro-magnet $a$ is against the stop $e$, thus placing the condenser C in connection with the artificial line $d$. The condenser will thus receive a charge from the artificial line, and this charge compensates for the static charge received by the main line L. When the key is released by the interruption of the circuit at the point $k^3$ of the key K', then the condenser C is disconnected from the artificial line $d$ and connected with the earth, and thus allowed to discharge. At the same time the lever $h$ makes contact with the stop $h'$, thus connecting an artificial line, $d$, with the stop $p$, as shown in Fig. 2. The key K, in moving from one to the other of its limiting stops, first allows the lever $k'$ to make contact with the stop $m$; but before it separates the lever $k^2$ from the stop $p$ the circuit through the line $l'$ will have been completed at the point $k'$ a sufficient time to allow a current from the battery B to reach the artificial line $d$ and thus traverse the coil M', and this current will neutralize the effect of the static discharge of the main line L, occuring at the same time. The further movement of the key K will separate the lever $k^2$ from the point $p$, and thus disconnect the battery B from the artificial line.

We claim as our invention—

1. The hereinbefore-described method of compensating for the static capacity of a main line, which consists in diverting a portion of the current from the artificial line at the moment of completing the circuit with the main line, subsequently discharging such diverted current to the earth, and in sending a current from an independent source to the artificial line at the moment of interruption of the circuit with the main line, substantially as described.

2. The combination, with a differential receiving-instrument, of a battery, a key for transmitting currents from the battery through the differential receiving-instrument, a condenser, an artificial line, means for connecting the condenser with the artificial line upon closing the circuit of the battery, a normally-interrupted circuit between the artificial line and the battery, and means for momentarily completing such circuit upon the separation of the battery from the main line.

3. The combination, substantially as hereinbefore set forth, of a main line, an artificial line, a differential receiving-instrument, a battery, a key, a condenser, a normally-interrupted connection between the battery and the artificial line, means for completing the connections of the battery with the artificial line by the operation of the transmitting-key during its movement from one to the other of its limits, and means for connecting the condenser with the artificial line when the key is in position to transmit a current from the battery, substantially as described.

4. The combination, with a main and an artificial line, of a differential receiving-instrument, a battery, a key for connecting said battery with said main and artificial lines, an electro-magnet for operating said key, a condenser, an electro-magnet for connecting and disconnecting said condenser with the artificial line, a third electro-magnet for connecting and disconnecting said battery with the artificial line at a point beyond the differential receiving-instrument, a local circuit including the three electro-magnets, and a key for controlling the connections of the same, substantially as described.

In testimony whereof I have hereunto subscribed my name this 24th day of May, A. D. 1886.

JOSEPH W. LARISH.

Witnesses:
 S. H. SMITH,
 G. H. USHER.

In testimony whereof I have hereunto subscribed my name this 3d day of June, A. D. 1886.

WILLIAM MAVER, JR.

Witnesses:
 DANL. W. EDGECOMB,
 CHARLES A. TERRY.